Patented June 16, 1936

2,044,015

UNITED STATES PATENT OFFICE 2,044,015

BENZONITRILES AND PROCESS FOR MAKING

Robert L. Perkins and Alvin J. Sweet, East Aurora, N. Y., assignors to National Aniline & Chemical Company, Inc., New York, N. Y., a corporation of New York No Drawing. Application December 5, 1933,
Serial No. 701,050

13 Claims. (Cl. 260—99.30)

This invention relates to benzonitriles and it is especially directed to hitherto unknown benzonitrile compounds containing as ring substituents an alkoxy or aralkoxy group and a nitro or amino group. The invention also relates to the production and use of these new compounds. More particularly, the invention is directed to the preparation of 2-amino- or 2-nitro- substituted 4-alkoxybenzonitriles. The following general formula:

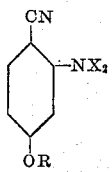

wherein X represents hydrogen or oxygen, and R represents any alkyl or aralkyl group, illustrates the general structure of these compounds.

The 2-nitro-4-alkoxy- (or aralkoxy)-benzonitriles are crystals having a tan to brown color, sparingly soluble in water, soluble in ethyl alcohol and other organic solvents. They may be converted by reduction to the corresponding aminonitriles.

The 2-amino-4-alkoxy- (or aralkoxy)-benzonitriles are colorless bodies, sparingly soluble in water, soluble in strong mineral acids, and soluble in alcohol and other organic solvents. They may be converted by hydrolysis to the corresponding benzamides or the corresponding benzoic acids.

The products of the present invention are adapted for uses analogous to those of known benzonitriles and are especially suitable as intermediates in the production of dyestuffs.

The nitro-alkoxy- (or aralkoxy)-benzonitriles of the present invention may be prepared by the action of an alkali-metal cyanide upon a diazotized nitro-alkoxy- (or aralkoxy)-aniline with evolution of nitrogen, the nitro and alkoxy radicals being joined to the aromatic nucleus. The amino-alkoxy- (or aralkoxy)-benzonitriles may be prepared readily from the nitro-alkoxy- (or aralkoxy)-benzonitriles by the reduction of the nitro group with a suitable reducing agent, as for example, zinc dust in slightly acid solution.

The following examples are illustrative of the methods suitable for preparing the products of this invention.

*Example 1.*—60 parts by weight of 2-nitro-4-ethoxy-aniline are dissolved in 268 parts of 16% aqueous hydrochloric acid. The solution is diazotized at 0 to 5° C. by the addition of 114 parts of 21% aqueous sodium nitrite solution. Upon completion of diazotization sodium carbonate is added to the solution of the diazo compound in sufficient quantity to just neutralize the acidity of the solution. The solution is filtered from any insoluble matter that may be present.

The filtered, substantially neutral solution of the diazotized nitro-ethoxyaniline thus formed is added slowly with stirring to a solution of copper sulfate and sodium cyanide maintained at 40° C. This sulfate-cyanide solution comprises 75 parts of copper sulfate ($CuSO_4.5H_2O$) and 85 parts of sodium cyanide (NaCN) dissolved in 810 parts of water. The reaction mixture is stirred at 40° C. until nitrogen ceases to be evolved in any substantial quantities. This treatment results in the formation of crystals of the benzonitrile. These are separated from the solution and recrystallized from 50% ethyl alcohol. The resultant crystals of the nitro-ethoxy-benzonitrile are light tan to brown in color, have a melting point of 82.5 to 83° C., and have the following probable formula:

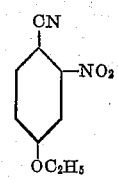

They are readily soluble in alcohol and sparingly soluble in water.

*Example 2.*—80 parts by weight of 2-nitro-4-ethoxy-benzonitrile prepared, for example, by the method of Example 1, are slowly added over a period of about 4 to 5 hours to 324 parts of a suspension comprising 124 parts of zinc dust suspended in 200 parts of water and simultaneously or alternately there is added sufficient hydrochloric acid to maintain the solution slightly acid. About 600 parts of 31% (1.16 specific gravity) HCl are required. The temperature of the mixture, while mixing the components, is maintained below 45° C. in any suitable manner as by the addition of ice. During the addition of the nitro-ethoxy-benzonitrile the solution should be continuously agitated to provide uniform reaction conditions and avoid local overheating. After the addition of the nitro-ethoxy-benzonitrile the solution is slowly heated to boiling and the hot solution is filtered. The filtrate is cooled to 20° C. and neutralized by the addition of sodium carbonate. The amino-ethoxy-benzonitrile which separates out gives, upon crystallization from water, colorless crystals which have a melting point of 112 to 112.5° C. They are soluble in alcohol and in concentrated hydrochloric acid, and are only slightly soluble in water. The product has the following probable formula:

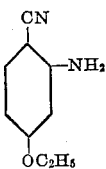

By hydrolysis with caustic soda, it may be converted to 2-amino-4-ethoxy-benzamide or to 2-amino-4-ethoxy-benzoic acid. It may be pointed out that a mixture of 4-ethoxy-2-amino-benzonitrile and 4-ethoxy-2-amino-benzamide can be produced by subjecting 4-ethoxy-2-nitro-benzonitrile to reduction in a substantially neutral medium.

In similar manner the homologues of the above benzonitriles may be produced. The ethoxy group may be replaced by any alkoxy or aralkoxy group, for example, a methoxy-, propyloxy-, butyloxy-, benzyloxy-, methylbenzyloxy-group.

We claim:

1. As a new compound a member of the group consisting of 2-nitro-4-alkoxy-benzonitriles, 2-nitro-4-aralkoxy-benzonitriles, 2-amino-4-alkoxy-benzonitriles, and 2-amino-4-aralkoxy-benzonitriles.

2. As a new compound a member of the group consisting of 2-nitro-4-ethoxy-benzonitrile and its homologues.

3. As a new compound a member of the group consisting of 2-amino-4-ethoxy-benzonitrile and its homologues.

4. As a new compound 2-nitro-4-ethoxy-benzonitrile.

5. As a new compound 2-amino-4-ethoxy-benzonitrile.

6. The method of preparing a 2-nitro-4-ethoxy-benzonitrile which comprises treating diazotized 2-nitro-4-ethoxy-aniline with an alkali-metal cyanide and copper sulfate.

7. The method of preparing a 2-amino-4-alkoxy-benzonitrile or 2-amino-4-aralkoxy-benzonitrile, which comprises treating a diazotized member of the group consisting of 2-nitro-4-alkoxy-aniline and 2-nitro-4-aralkoxy-aniline with an inorganic cyanide and subjecting the reaction product to the action of a reducing agent.

8. The method of preparing 2-amino-4-ethoxy-benzonitrile which comprises treating diazotized 2-nitro-4-ethoxy-aniline with an alkali-metal cyanide and copper sulfate and subjecting the reaction product to the action of a reducing agent.

9. In the preparation of a 2-amino-4-alkoxy-benzonitrile or 2-amino-4-aralkoxy-benzonitrile the step which comprises subjecting a member of the group consisting of 2-nitro-4-alkoxy-benzonitrile and 2-nitro-4-aralkoxy-benzonitrile to the action of a reducing agent.

10. In the preparation of a 2-amino-4-ethoxy-benzonitrile the step which comprises treating a 2-nitro-4-ethoxy-benzonitrile in slightly acid solution with metallic zinc.

11. The method of preparing 2-amino-4-ethoxy-benzonitrile which comprises subjecting 2-nitro-4-ethoxy-aniline to diazotization, treating the diazotization product with a solution of sodium cyanide and copper sulfate so as to form 2-nitro-4-ethoxy-benzonitrile, and subjecting said nitrile in slightly acid solution to the action of metallic zinc so as to reduce it to 2-amino-4-ethoxy-benzonitrile.

12. As a new benzonitrile compound the product of reaction of diazotized 2-nitro-4-ethoxy-aniline with an alkali-metal cyanide and copper sulfate, said product having a melting point of about 83° C., being sparingly soluble in water and soluble in ethyl alcohol.

13. As a new benzonitrile compound the product of reaction of metallic zinc in slightly acid solution with the product of claim 12, said benzonitrile compound having a melting point of about 112° C. and being slightly soluble in water, soluble in ethyl alcohol and soluble in concentrated hydrochloric acid.

ROBERT L. PERKINS.
ALVIN J. SWEET.